Figures 1, 2:
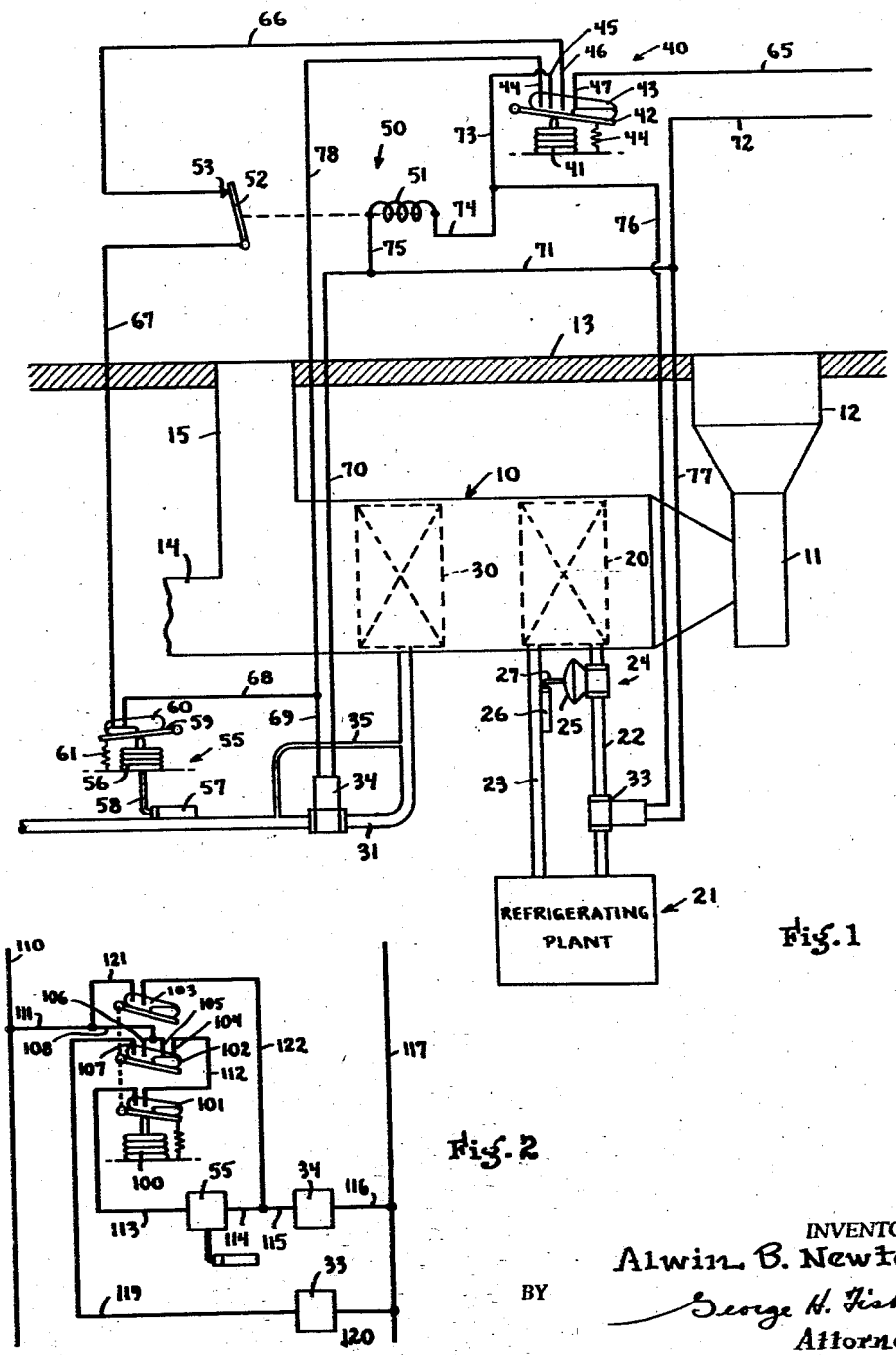

June 27, 1944.  A. B. NEWTON  2,352,282
STAGE CONTROLLED AIR CONDITIONING SYSTEM
Filed April 30, 1942

INVENTOR.
Alwin B. Newton
BY George H. Fisher
Attorney

Patented June 27, 1944

2,352,282

UNITED STATES PATENT OFFICE 2,352,282

STAGE CONTROLLED AIR CONDITIONING SYSTEM

Alwin B. Newton, Minneapolis, Minn., assignor to Minneapolis-Honeywell Regulator Company, Minneapolis, Minn., a corporation of Delaware Application April 30, 1942, Serial No. 441,126

12 Claims. (Cl. 62—6)

The present invention relates to air conditioning systems and particularly to control of air conditioning systems wherein both artificial refrigeration and a supply of water such as city water is used for cooling.

The primary object of the invention is to provide control means whereby a source of cooling water such as city water, and artificial refrigeration may both be used for cooling and dehumidifying in a most efficient and effective manner.

Another object of the invention is to provide an air conditioning system having automatic controls wherein a water cooling coil and a direct expansion refrigeration coil are used for cooling and dehumidifying, the water cooling coil being turned on upon an initial demand for cooling, the refrigeration coil being turned on and the water cooling coil turned off upon an increased demand for cooling so that the refrigeration coil will remove a greater percentage of latent heat, both coils being turned on upon a still further increase in demands for cooling to increase the percentage of sensible heat removed.

Another object is to provide control means in a system embodying a cooling coil utilizing city water whereby operation of the said coil is normally prevented when the temperature of the city water supply is not low enough to provide for effective cooling.

Numerous other objects and advantages of my invention will be apparent from the following detailed description when considered in the light of the accompanying drawing in which Figure 1 is a schematic representation of a system embodying the various features of my invention, and Figure 2 is a view showing a slightly different circuit arrangement.

In Figure 1, numeral 10 designates an air conditioning duct of usual type, the right end of which is connected to the inlet of an air circulating fan 11. The fan 11 discharges into a duct 12 which communicates with a room or other space 13 wherein the temperature is to be maintained at a desirable value. Fresh air may be taken into the duct 10 through a fresh air passage 14 and return air from the room or space 13 is communicated to the duct 10 through a duct 15 so that it mixes with the fresh air coming in through the passage 14. As is conventional practice in the air conditioning art, fresh and return air dampers may be provided so as to manually or automatically control the mixture of fresh and return air.

Disposed in the duct 10 is an evaporator or refrigeration coil 20 forming a part of a refrigeration system. The refrigeration system or plant is designated by the numeral 21, and it comprises the usual refrigerant compressor and condenser connected in refrigerant flow relationship. The evaporator is connected to the plant so as to have refrigerant supplied thereto through a pipe 22, the outlet of the evaporator being connected to the compressor of the system through a suction pipe 23. Interposed in the supply pipe 22 is an expansion valve 24 of a conventional type which is arranged to maintain a predetermined degree of superheat in the outlet of the evaporator. The expansion valve 24 has operating mechanism including an expansible and contractible chamber designated by the numeral 25 which is connected to a thermal bulb 26 by a capillary tube 27. The thermal bulb is disposed in intimate heat exchange relationship with the outlet conduit 23, and it contains a volatile liquid which vaporizes and develops a pressure in the chamber 25 corresponding to the temperature of the superheated gas in the outlet conduit 23. The operation of the expansion valve 24 is well known in the art and need not be described in further detail. Disposed in the duct 10 ahead of the coil 20 is another coil 30 which is arranged to have city water or water from another suitable source supplied thereto for cooling purposes. Water is supplied to the coil 30 through a pipe 31 and the water is discharged through another pipe, not shown.

The supply of refrigerant to the coil 20 and the supply of water to the coil 30 may be started and stopped by means of an automatic electric valve. Disposed in the supply conduit 22 of the coil 20 is an electric type stop valve 33 which permits normal operation of the evaporator or coil 20 when it is opened and shuts off the supply of refrigerant when it is closed. Disposed in the pipe 31 is a similar type electric stop valve 34 which permits the flow of water through the pipe 31 when it is open and shuts off the flow when it is closed. Numeral 35 designates a small by-pass tube which by-passes the valve 34 for a purpose which will presently appear.

The controls for the system include a thermostat 40 responsive to the temperature in the room or space being conditioned. The thermostat 40 includes an expansible and contractible bellows 41, the movable end of which carries an operating stem which normally engages a pivoted switch carrying lever 42. Lever 42 carries a mercury switch 43 and the lever is normally biased in a clockwise direction by a coil spring 44. The mercury switch 43 is of a type having a plurality of electrodes designated by the numerals 44, 45, 46 and 47, the electrodes being spaced apart and being spaced from the left end of the mercury tube. When the temperature in the space is relatively low the switch is in the position shown on the drawing with the mercury at the right end of the tube. Upon rising temperatures the lever 42 is tilted in a counter-clockwise direction as the bellows 41 expands causing the mercury to tend to move towards the left end of the tube. The globule of mercury normally engages electrode 47 and as the tube is tilted in a counter-clockwise direction, the mercury will first engage electrode 46 and this may occur at a temperature of 76°, for example. Upon a continued increase in temperature the tube 43 will be rotated in a counter-clockwise direction causing the mercury to successively engage electrodes 45 and 44 at temperatures of 78° and 80°, for example. At a temperature of 80°, all of the electrodes will be bridged by the mercury. Upon falling temperatures, the electrodes are disengaged by the mercury in a reverse manner.

The thermostat 40 controls a relay 50 comprising a winding 51 having an armature associated therewith which is attached to a movable switch blade 52 which normally engages a fixed contact 53 when the relay is deenergized, and which is moved to the right away from the said contact when the relay is energized.

Numeral 55 designates a thermostat or thermostatic controller comprising an expansible and contractible bellows 56 connected to a thermal bulb 57 by a capillary tube 58. The thermal bulb 57 is disposed in intimate heat exchange relationship with the pipe 31 or some other frequently used pipe through which city water passes or other water which is used for cooling in the coil 30. The bulb 57 contains a volatile liquid which vaporizes and develops a pressure in bellows 56 dependent upon the temperature of the water in pipe 31. The movable end of the bellows 56 carries a stem which normally engages a pivoted switch carrying lever 59, which carries a mercury switch 60. The lever 59 is normally biased in a counter-clockwise direction by a coil spring 61. Whenever the temperature of the water in pipe 31 is below a predetermined value, the mercury switch 60 is closed and the switch 60 is opened when the temperature in the pipe 31 rises above a predetermined value which would be too high for effective cooling in the coil 30.

The operation of the system will now be explained. With the parts in the position shown, the temperature in the space is below the desired value so that neither of the coils 30 or 20 are in operation. As the temperature in the space rises in a manner already described above, mercury switch 43 will be moved to a position wherein the mercury bridges electrodes 46 and 47. When this occurs the water coil 30 will be put into operation by means of a circuit causing opening of valve 34, this circuit being as follows: from wire 65, to electrode 47 of mercury switch 43, electrodes 46, wire 66, contact 53, switch blade 52, wire 67, mercury switch 60, wire 68, wire 69, valve 34, wire 70, wire 71 back to wire 72, the wires 65 and 72 being connected to any suitable source of power, not shown. (If the temperature of the water in pipe 31 should be high enough to have mercury switch 60 open, of course valve 34 would not be opened because the water would not then be at a temperature suitably low for cooling in coil 30. The purpose of the by-pass 35 is to conduct a very small flow of water through the coil 30 at all times so that this water will be passed in heat exchange relationship with the bulb 57 so that it at all times measures the temperature of the water and controls the mercury switch 60 accordingly.) Assuming that the cooling load is increasing the capacity of coil 30 will not be sufficient to maintain the temperature desired in the space, and the temperature will continue to rise until the mercury in mercury switch 43 engages electrode 45. When this occurs, relay 50 is energized and valve 33 is opened. The circuit for energizing relay 50 is as follows: from wire 65 through electrodes 47 and 45 of mercury switch 43, wire 73, wire 74, winding 51, wire 75, wire 71, back to wire 72. When relay 50 is energized, switch blade 52 moves away from contact 53 interrupting the circuit of valve 34 and closing this valve. The circuit for valve 33 is as follows: from wire 65 through electrodes 47 and 45 of mercury switch 43, wire 73, wire 76, valve 33, wire 77, back to wire 72. When valve 33 is thus opened, the refrigerating plant is placed in operation inasmuch as refrigerant is permitted to flow to the evaporator 20 through pipe 22. The resulting rise in pressure in the evaporator 20 puts the compressor of the refrigerating plant in operation, it being understood that the compressor is controlled in the conventional manner, that is by means of a suction pressure responsive controller. The evaporator coil 20 will now be operating alone to effect both cooling and dehumidification of the air in the duct 10, the water coil 30 not now being in operation. The water coil 30 is rendered inoperative at this time so that the refrigeration coil 20 will remove the desired percentage of latent heat. If the water coil were also operating only a very small percentage of latent heat would be removed by the coil 20. Normally the cooling capacity of the coil 20 will be somewhat greater than that of the coil 30 but assuming that the cooling load is still increasing it will not be sufficient to maintain the temperature in the space alone. Therefore the temperature will continue to rise until the mercury in mercury switch 43 engages electrode 44, this closing another circuit causing opening of the valve 34, this circuit being as follows: from wire 65 through electrodes 47 and 44 of mercury switch 43, wire 78, wire 69, valve 34, wire 70, wire 71, back to wire 72. Valve 34 now opens for supplying water through the coil 30 so that both of the coils are operating, their combined capacity producing maximum cooling of the air passing through the duct 10.

It will be noted that the circuit for valve 34 is now independent of the thermostatic controller 55 so that the valve will now be opened irrespective of the temperature of the water entering through pipe 31. When both of the coils are operating even if the water temperature is relatively high, it will be low enough to have some cooling effect on the air before the air passes over the refrigeration coil 20 and thus the effectiveness of the system will be increased by that much.

Upon falling temperatures, the sequence of operation is the reverse of that described above, that is first the water coil 30 will be cut off while coil 20 operates alone, then operation of the refrigeration coil 20 will be discontinued while the coil 30 is turned on again, and finally the coil 30 will be turned off.

My arrangement provides a way of utilizing the water supply and the artificial refrigeration to the best advantage whereby the system is operated to produce cooling under the most effective and efficient conditions. Economy is promoted by operating the water coil only when its cooling effect can be effectively utilized and the load is not such as to require use of the artificial refrigeration. By operating the refrigeration coil alone under moderate load conditions, the proper ratio is maintained between sensible cooling and the removal of latent heat. Under maximum cooling load the water coil is rendered operative so that the system will perform a maximum amount of sensible cooling while lowering the ratio of latent to sensible cooling. In other words, under maximum cooling loads the system is operated to remove a maximum amount of sensible heat at the expense of the humidity of the air passing over the coils. As soon as the temperature in the space is reduced the water coil is deenergized to again establish the proper ratio between sensible and latent cooling.

Referring now to Figure 2 of the drawing, it will be seen that the solenoid valve 34 controlling the water cooling coil 30 and the solenoid valve 33 controlling the refrigeration coil 20 have been given the same reference numerals as in Figure 1. The thermostatic switch 55 is also adapted to respond to the temperature of the source of supply of the cooling water in the same manner as in connection with the system disclosed in Figure 1. In Figure 2, however, a slightly different form of thermostatic switching arrangement for the space is used. This thermostatic switching mechanism comprises a temperature responsive bellows 100 which actuates three separate mercury switches indicated at 101, 102, and 103. The mercury switch 102 is illustrated as a double-ended switch and it is so arranged that as the switch is rotated in a counter-clockwise direction upon expansion of the bellows 100, the mercury will first unbridge the electrodes 104 and 105 and then upon a slight increase in temperature will bridge the electrodes 106 and 107, the electrodes 105 and 106 being connected electrically to the common conductor 108, and thus forming together the common electrode of the switch.

The bellows 100 is shown in the position in which it will occupy when the temperature in the space is such that no cooling is required. Under these circumstances, the mercury switches 101 and 103 will be in open circuit position and the mercury in the mercury switch 102 will be bridging the two electrodes 104 and 105 in the right hand end of the switch. When the temperature in the space to be conditioned increases slightly indicating a very light load, the bellows 100 will expand and cause all of the mercury switches to be rotated in a counter-clockwise direction. At a temperature of 76°, for example, the bellows 100 will expand far enough to cause the mercury in the switch 101 to move to the left hand end of the switch and establish a circuit which extends from the line wire 110 through conductors 111 and 108, electrodes 105 and 104, conductor 112, mercury switch 101, conductor 113, thermostatic switch 55, which will be closed if the water temperature feeding the coil 30 is sufficiently cool, conductors 114 and 115, solenoid valve 34 controlling the supply of cooling water to the coil 30 and conductor 116 to the other line wire 117. The establishment of this circuit therefore provides for the flow of water to the water coil 30 and the subsequent cooling of the air passing through the conditioning chamber 10. If the load on the system continues to be very light the temperature of the air in the space to be conditioned will decrease and the bellows 100 will accordingly contract and open the above circuit. The temperature in the space will therefore be maintained at approximately 76° in the above manner under light loads.

If the load on the system increases the bellows 100 will expand further assuming that the operation of the water coil 30 can no longer maintain the space temperature at 76°. The further expansion of the bellows 100 will cause a further rotation of the mercury switches in a counter-clockwise direction and the mercury in the mercury switch 102 will then unbridge the electrodes 104 and 105 and therefore deenergize the solenoid valve 34 at which time the water coil 30 will no longer cool the air passing through the conditioning chamber 10.

At this time the temperature in the space will probably continue to increase due to the deenergization of the water coil 30 and after an increase of about a quarter or half a degree in temperature the bellows 100 will have expanded far enough to cause the mercury in the mercury switch 102 to bridge the electrodes 106 and 107. This will establish a circuit from the line wire 110 through conductors 111, and 108, electrodes 106 and 107, conductor 119, solenoid valve 33 for the refrigeration coil 20, and conductor 120 back to the other line wire 117. This will result in the energization of the refrigeration coil 20 which will be in operation alone and which will, as described above, maintain the proper ratio between latent and sensible cooling. If the capacity of the refrigeration coil 20 alone is sufficient to decrease the temperature in the space then the refrigeration coil 20 will be deenergized by the mercury switch 102 without the reenergization of the water coil 30. In other words, the mercury switch 102 will be rotated in a clockwise direction far enough to unbridge the electrodes 106 and 107 but not far enough to bridge the electrodes 104 and 105. If the temperature then increases in the space the mercury switch 102 will then again energize the refrigeration coil 20. Therefore, under moderate load conditions the temperature within the space will be maintained by the alternate energization and deenergization of the refrigeration coil 20 without the operation of the water coil 30. It might be pointed out that the mercury switch 101 controls the solenoid valve 34 at a differential of from 1 to 1½° and that the mercury switch 102 controls the solenoid valve 33 at a differential of from 1 to 1½° and that there is approximately a half a degree differential between the operation of the two solenoid valves 33 and 34.

If the cooling load on the system should be so heavy that the refrigeration coil 20 is incapable of maintaining the temperature in the space below 80°, then the bellows 100 will expand sufficiently to cause the mercury switch 103 to move to closed circuit position. This will establish a circuit from the line wire 110 through conductors 111, 121, mercury switch 103, conductors 122 and 115, solenoid valve 34 and conductor 116 back to the other line wire 117. Thus, when the temperature in the space reaches 80° both the refrigeration coil 20 and the water coil 30 will be rendered operative to effect the maxmium amount of sensible cooling. Of course if the temperature in the space should then be lowered to a value somewhat below 80° the mercury switch 103 would again move to open circuit position and deenergize the solenoid valve 34 for the water coil 30.

If desired the usual two-position type of mercury switch may be substituted for the mercury switch 102 so that as soon as the mercury unbridges the electrodes 104 and 105 it will bridge the electrodes 106 and 107. If such a switch is used it will be obvious that the sequence of operation of the water coil and the refrigeration coil will be exactly the same as that described in connection with the modification shown in Figure 1. As many other changes and modifications of this system may occur to those who are skilled in the art, I desire it to be understood that I intend to be limited only by the scope of the appended claims and not by the specific embodiments of the invention which have been disclosed herein for the purposes of illustration.

I claim as my invention:

1. In an air conditioning system, in combination, air cooling means comprising artificial refrigerating means, means comprising a heat exchanger having a source of fluid supply therefor, and means responsive to cooling requirements for first operating the heat exchanger alone, then operating the artificial cooling means alone, and then operating both the heat exchanger and the artificial cooling means in response to increasing cooling requirements.

2. In an air conditioning system, in combination, air cooling means comprising artificial refrigerating means, means comprising a heat exchanger having a source of water supply therefor, means responsive to cooling requirements for first operating the heat exchanger alone, then operating the artificial cooling means alone, and then operating both the heat exchanger and the artificial cooling means in response to increasing cooling requirements, and means for preventing operation of the heat exchanger when the temperature of the supply water is above a predetermined value.

3. In an air conditioning system, in combination, air cooling means comprising artificial refrigerating means, means comprising a heat exchanger having a source of water supply therefor, means responsive to cooling requirements for first operating the heat exchanger alone, then operating the artificial cooling means alone, and then operating both the heat exchanger and the artificial cooling means in response to increasing cooling requirements, and means responsive to the temperature of the water supplied to the heat exchanger for preventing supply of water thereto when the temperature of the water is above a predetermined value upon a demand for operation of the heat exchanger alone.

4. In an air conditioning system, in combination, air cooling means comprising artificial refrigerating means, means comprising a heat exchanger having a source of water supply therefor, means responsive to cooling requirements for first operating the heat exchanger alone, then operating the artificial cooling means alone, and then operating both the heat exchanger and the artificial cooling means in response to increasing cooling requirements, and means responsive to the temperature of the water supplied to the heat exchanger for normally preventing the water from being supplied thereto when the temperature of the water is above a predetermined value, the said means responsive to cooling requirements having means for causing both the heat exchanger and the artificial refrigerating means to operate irrespective of said temperature responsive means under heavy cooling load requirements.

5. In apparatus of the character described, in combination, air cooling means comprising a water coil and a refrigeration coil, means responsive to cooling demands for operating the water coil upon a demand for cooling, said cooling demand responsive means embodying means for turning off the water coil and turning on the refrigeration coil upon increased cooling demands and for again turning on the water coil upon further increased cooling demands.

6. In apparatus of the character described, in combination, a heat exchanger adapted to have water circulated therethrough, a refrigerating system having an evaporator, means for passing air over said heat exchanger and evaporator, a valve controlling the flow of water to the heat exchanger, a second valve controlling the flow of refrigerant to the evaporator, control means comprising a multi-stage thermostat responsive to the temperature of the air, means whereby upon an initial rise in temperature the thermostat opens the first valve admitting water to the heat exchanger, means whereby upon a further rise in temperature the thermostat closes the first valve and opens the second valve, and means whereby upon a still further rise in temperature the first valve is reopened.

7. In apparatus of the character described, in combination, a heat exchanger adapted to have water circulated therethrough, a refrigerating system having an evaporator, means for passing air over said heat exchanger and evaporator, a valve controlling the flow of water to the heat exchanger, a second valve controlling the flow of refrigerant to the evaporator, control means comprising a thermostatic means responsive to temperature of water flowing to the heat exchanger and a multi-stage thermostat responsive to the temperature of the air, means whereby upon an initial rise in temperature the thermostat opens the first valve dependently on said thermostatic means for admitting water to the heat exchanger, means whereby upon a further rise in temperature the thermostat closes the first valve and opens the second valve, and means whereby upon a still further rise in temperature, the thermostat reopens the first valve irrespective of said temperature responsive means.

8. In an air conditioning system comprising in combination, a first heat exchanger for removing principally sensible heat from the air to be conditioned, a second heat exchanger for removing substantial amounts of both sensible and latent heat from the air to be conditioned, and means responsive to the temperature of the conditioned air for rendering said first heat exchanger operative when the temperature is such as to indicate a relatively light load on the system, for rendering said first heat exchanger inoperative and said second heat exchanger operative upon an increase in said load, and for rendering both of said heat exchangers operative upon a still further increase in said load.

9. In an air conditioning system comprising in combination, a first heat exchanger for removing principally sensible heat from the air to be conditioned, a second heat exchanger for removing substantial amounts of both sensible and latent heat from the air to be conditioned, means rendering said first heat exchanger operative when the temperature of the conditioned air is within a first predetermined range, rendering both of said heat exchangers inoperative when said temperature is within a higher range, rendering said second heat exchanger operative when said temperature is within a still higher range, and rendering both of said heat exchangers operative when said temperature exceeds said last named range.

10. In an air conditioning system comprising in combination, a first heat exchanger for removing principally sensible heat from the air to be conditioned, a second heat exchanger for removing substantial amounts of both sensible and latent heat from the air to be conditioned, a thermostat responsive to the temperature of the conditioned air, a first switch operated by said thermostat upon an increase in temperature for rendering said first heat exchanger operative, a second switch operated by said thermostat at a higher temperature for rendering said first heat exchanger inoperative and said second heat exchanger operative, and a third switch operated by said thermostat at a still higher temperature for rendering said first heat exchanger operative again.

11. In an air conditioning system comprising in combination, a first heat exchanger for removing principally sensible heat from the air to be conditioned, a second heat exchanger for removing substantial amounts of both sensible and latent heat from the air to be conditioned, a thermostat responsive to the temperature of the conditioned air, a first switch operated by said thermostat upon an increase in temperature for rendering said first heat exchanger operative, a second switch operated by said thermostat at a higher temperature for rendering said first heat exchanger inoperative and said second heat exchanger operative, and a third switch operated by said thermostat at a still higher temperature for rendering said first heat exchanger operative again, said second switch rendering said second heat exchanger operative at a higher temperature than that at which it renders said first heat exchanger inoperative.

12. In an air conditioning system comprising in combination, air conditioning means comprising artificial refrigerating means and heat exchanger means having a source of cooling fluid therefor, a temperature responsive device, means operated by said device for controlling heat exchanger means to maintain the proper temperature when said temperature is within a first predetermined range, said controlling means rendering said heat exchange means inoperative when said temperature is within a relatively small higher range, means operated by said device for controlling said artificial refrigerating means to regulate the temperature when said temperature is within a still higher range, and means operated by said device to reenergize said heat exchanger means when the temperature exceeds said last named range.

ALWIN B. NEWTON.